US011457339B2

(12) United States Patent
Dennis et al.

(10) Patent No.: US 11,457,339 B2
(45) Date of Patent: Sep. 27, 2022

(54) VEHICLE INFOTAINMENT SYSTEM

(71) Applicant: Cubic Telecom Limited, Dublin (IE)

(72) Inventors: James Dennis, Dublin (IE); Barry Napier, Dublin (IE)

(73) Assignee: CUBIC TELECOM LIMITED, Dublin (IE)

( * ) Notice: Subject to any disclaimer, the term of this patent is extended or adjusted under 35 U.S.C. 154(b) by 0 days.

(21) Appl. No.: 17/263,785

(22) PCT Filed: Jul. 29, 2019

(86) PCT No.: PCT/EP2019/070394
§ 371 (c)(1),
(2) Date: Jan. 27, 2021

(87) PCT Pub. No.: WO2020/025557
PCT Pub. Date: Feb. 6, 2020

(65) Prior Publication Data
US 2021/0297828 A1    Sep. 23, 2021

(30) Foreign Application Priority Data

Jul. 30, 2018  (EP) .................................. 18186286

(51) Int. Cl.
*H04W 4/40* (2018.01)
*H04W 4/029* (2018.01)
*H04W 4/14* (2009.01)
*H04W 84/02* (2009.01)

(52) U.S. Cl.
CPC ............. *H04W 4/40* (2018.02); *H04W 4/029* (2018.02); *H04W 4/14* (2013.01); *H04W 84/02* (2013.01)

(58) Field of Classification Search
CPC ......... H04W 4/40; H04W 4/029; H04W 4/14; H04W 84/02; H04W 12/00; H04W 4/24; H04N 21/41422; H04L 67/125; H04M 15/76; H04M 15/765
See application file for complete search history.

(56) References Cited

U.S. PATENT DOCUMENTS

| | | | |
|---|---|---|---|
| 9,775,138 B1 | 9/2017 | Lei | |
| 2015/0111529 A1* | 4/2015 | Johnson | .................. H04W 4/44 455/406 |
| 2016/0126995 A1 | 5/2016 | Li | |
| 2018/0146356 A1* | 5/2018 | Bai | ........................ H04W 76/11 |

FOREIGN PATENT DOCUMENTS

EP             3270245 A1    1/2018

OTHER PUBLICATIONS

EPO; International Search Report and Written Opinion dated Nov. 6, 2019 in Application No. PCT/EP2019/070394.

* cited by examiner

*Primary Examiner* — Marcus Hammonds
(74) *Attorney, Agent, or Firm* — Snell & Wilmer L.L.P.; Kent A. Lembke (57) ABSTRACT

A method of providing network access to an in-vehicle infotainment system through a network access node is described.

21 Claims, 6 Drawing Sheets

VEHICLE INFOTAINMENT SYSTEM

This application is a national stage entry of International Patent Application No. PCT/EP2019/070394, filed Jul. 29, 2019, entitled "A VEHICLE INFOTAINMENT SYSTEM," which claims priority to European Patent Application No. 18186286.3 filed Jul. 30, 2018, entitled "A VEHICLE INFOTAINMENT SYSTEM," the disclosures of which are hereby incorporated by reference in their entirety.

FIELD

The present application relates to vehicle infotainment systems and in particular to a method for enabling wireless data connectivity of a vehicle infotainment system.

BACKGROUND

There has for many years being a movement towards connected vehicles. Since at least 2013, technology roadmaps such as those provided by the GSMA have identified that drivers and their passengers are increasingly seeking in-vehicle mobile connectivity to make travelling by car a safer, faster and richer experience. This need has been met by in-car entertainment (ICE), or in-vehicle infotainment (IVI), systems that have both Wifi and network modules- such as 5G/LTE/GSM modules. This enables the vehicle infotainment system to connect via Wifi to a user's smartphone and also simultaneously communicate to the network.

To enable this network connectivity, mobile operators and automakers need to collaborate. In particular, mobile operators need to deploy network technologies that support widespread, high-bandwidth connectivity. At the same time automakers have a requirement for solutions that can adapt to a wide range of use cases, such as a change of business model, a change of mobile operator and a change in the ownership of the vehicle.

In this general scenario, automakers have a number of options in how to enable vehicle connectivity. These include embedded devices, tethered solutions and integrated solutions (using mobile handsets that are already associated with a user). These three connectivity solutions are not mutually exclusive. A tandem approach is frequently used to separate the allocation of costs to the beneficiary (i.e. the automaker or the driver) or to provide an option for technology upgrades for newer generation or higher bandwidth services.

Embedded solutions where the connectivity and the processing intelligence is built directly into the vehicle need to be able to access networks with the bandwidth and coverage characteristics that are sufficient to support the services required by the connected vehicle. These are typically provided by embedded SIMs within the vehicle. In this embedded solution, a SIM is typically either associated with the vehicle at the time of manufacture and "embedded" into the vehicle or a subsequently provided SIM can be associated with the vehicle after manufacture, and typically after purchase of the vehicle. In such an arrangement, the vehicle will typically provide a slot or interface for user provision of a SIM.

Tethered solutions, where connectivity is provided through an external modem whilst the processing intelligence is retained by the vehicle are typically based routing communications through a paired handset. An integrated solution, is one where the connectivity is based on an integration between the vehicle and the handset associated with the user of the vehicle, in which all connectivity and intelligence is done at the handset.

Figure 1:
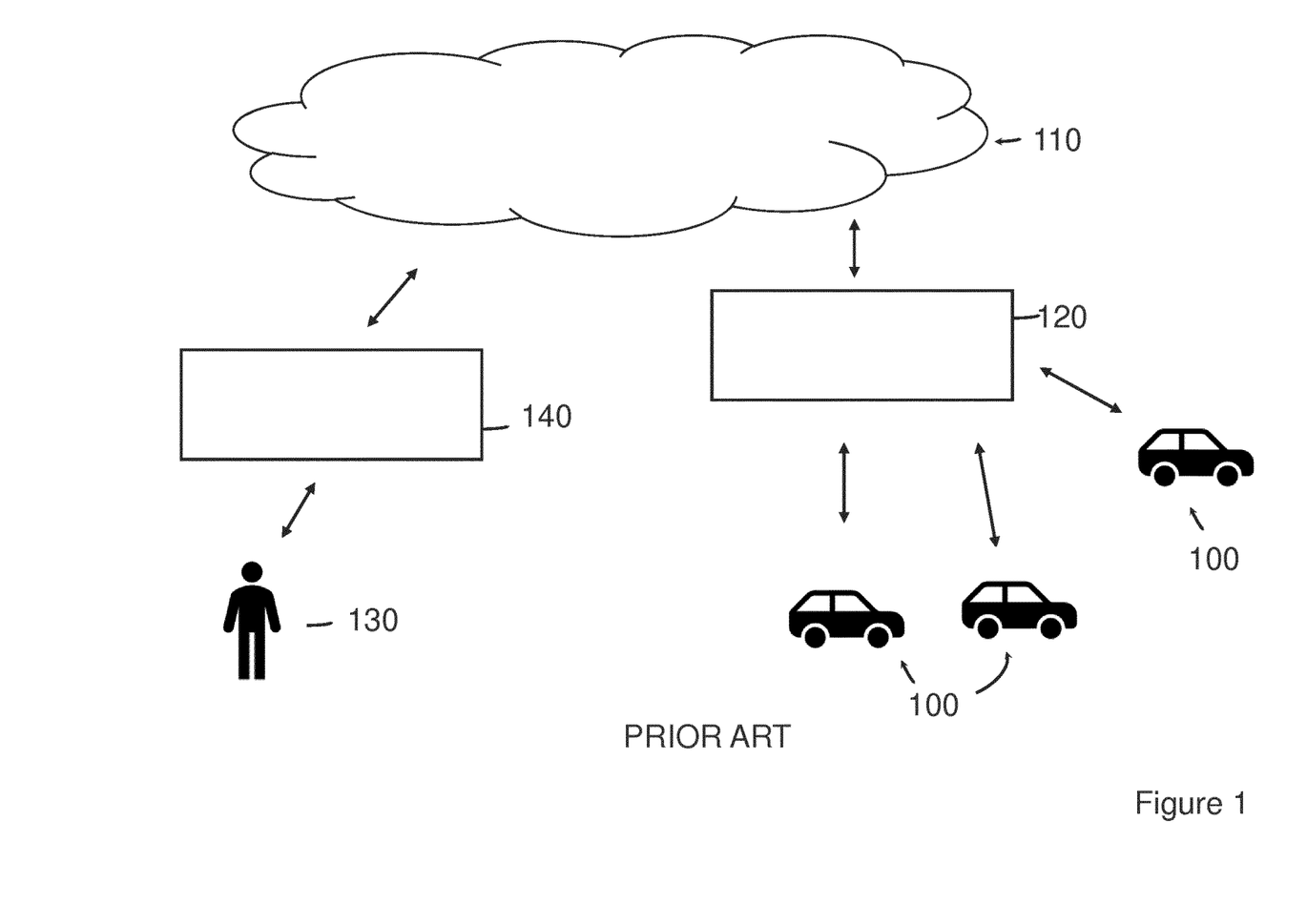
FIG. 1 is a schematic of a known system architecture for providing network connectivity.

With recent changes in regulation such as the European regulation on eCall, automotive manufacturers are required to provide a built in automated emergency call for assistance in a road accident. With this obligation on the automotive manufacturer and the need to ensure that connectivity can be provided across the fleet irrespective of the geography, automotive manufacturers are partnering with mobile operators to provide connectivity solutions. In these scenarios, a particular vehicle manufacturer configures their in-car entertainment (ICE), or in-vehicle infotainment (IVI), systems to access network services through a pre-associated automotive carrier service platform (ACSP) which manages mobile carrier network connectivity of the infotainment system and inter-operator relationships permitting the vehicle to access various carrier networks within a service area footprint. FIG. 1 is an example of such an architecture where one or more vehicles (100) can access network services (110) through a pre-defined automotive carrier service platform, ACSP (120). In this exemplary schematic all three illustrated vehicles are associated are associated with the same ACSP (120), but it will be appreciated that in a similar fashion to how smartphone users access network services through particular mobile network operators (MNOs), that different vehicles can be associated with different ACSPs. The type of network services that can be accessed from a particular vehicle can be pre-configured on a number of levels including at the actual vehicle level, the vehicle type level or at the ACSP level. Authorised network access through the ACSP requires validation of the SIM that is associated with the vehicle by the ACSP.

FIG. 1 also shows a conventional arrangement whereby a user 130 of the vehicle can also access network services 110 using their mobile device such as a smartphone. That network access is facilitated by the MNO 140 associated with the user's mobile device and similarly to the access by a vehicle requires validation by the MNO of the SIM that is associated with that mobile device. It will be appreciated that such association is typically achieved at a network level through association of a unique mobile identifier such as the device international mobile subscriber identity (IMSI) with a particular network operator.

In this example of FIG. 1, the user 130 can access the same or different network services. Irrespective of the fact that the user 130 could also be the driver of one of the vehicles 100, in this conventional arrangement there is no association at a network level between the two. Each of the two network access points are independent of one another and require validation of a SIM card that is specific to that network access point, each require dedicated resources and there is therefore an inevitable duplication of network activity.

EP 3 270 245 describes an arrangement for exchanging data with an in-vehicle infotainment system. It provides for binding infotainment systems with mobile terminals so as to allow a user to control the infotainment system with their mobile terminal.

SUMMARY

These and other problems are addressed in accordance with the present teaching by a method and architecture that associates at a network level, an in-vehicle network access point with a mobile operator of a user of that vehicle.

Accordingly, a first embodiment of the application provides a method as detailed in in claim 1. Advantageous embodiments are provided in the dependent claims. A system and a computer program which are respectively configured to carry out the method may also be provided.

BRIEF DESCRIPTION OF THE DRAWINGS

The present application will now be described with reference to the accompanying drawings in which.

DETAILED DESCRIPTION OF THE DRAWINGS

Figure 2:
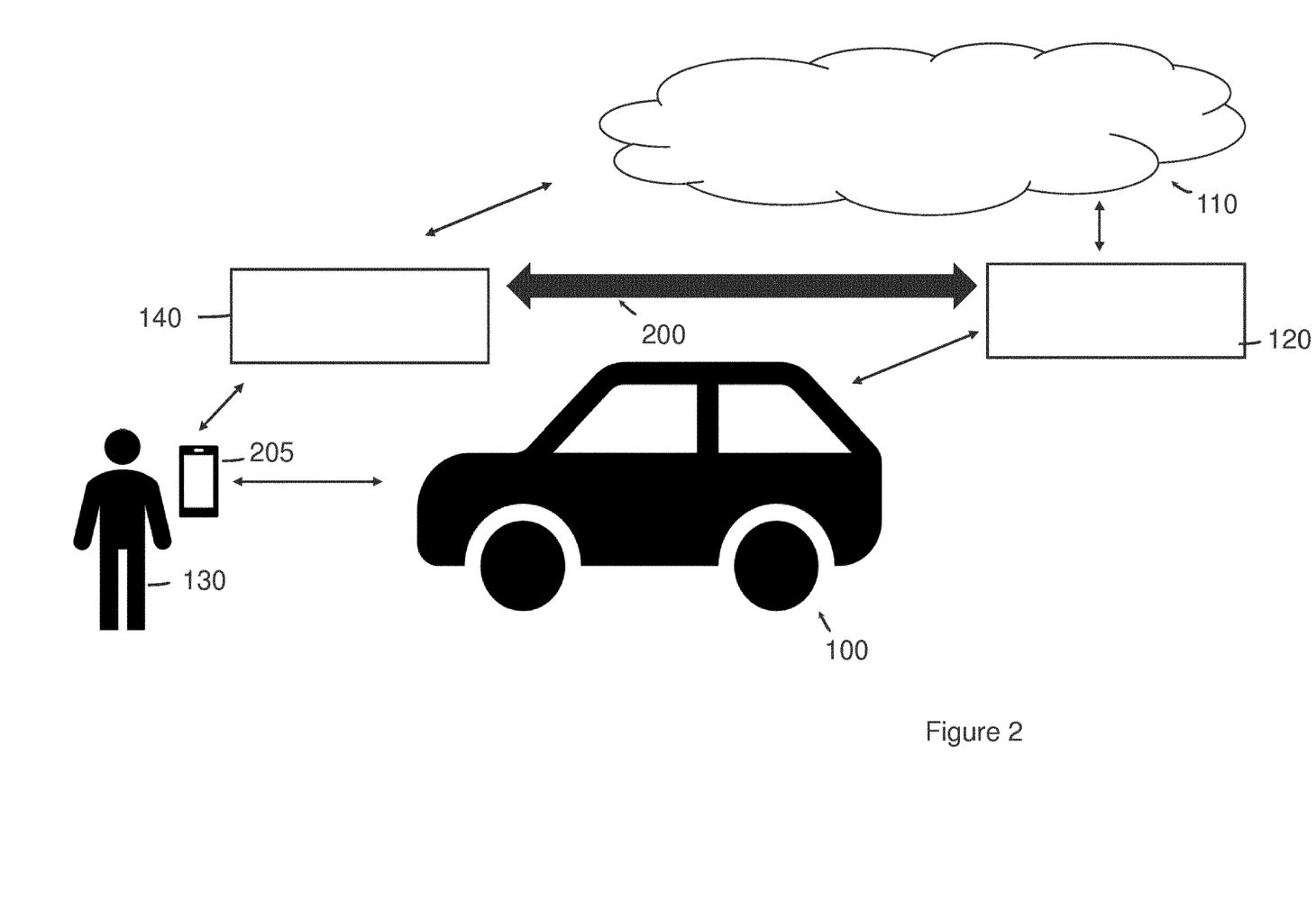
FIG. 2 is a modification to the architecture of FIG. 1, where there is provided, in accordance with the present teaching, an association at a network level between a vehicle network access service and a user mobile device network access service.

The present teaching will now be exemplified with reference to provisioning network access services to an in-vehicle infotainment system. As shown in FIG. 2, where similar the same reference numerals are provided to elements already described with reference to FIG. 1, the present teaching provides a method and architecture that facilitates a data exchange 200 at a network level between an automotive carrier service platform, ACSP (120) and a mobile device (205) mobile network operator (140). Such a data exchange is used in accordance with the present teaching to associate a SIM that is uniquely associated with the vehicle (100) with a SIM that is uniquely associated with the mobile device (205). Such association can be used to enable and control network access from the vehicle (100) via the ACSP (120) based on parameters and profiles that are defined for the user (130) access to the network from their mobile device (205) via the MNO (140).

Figure 3:
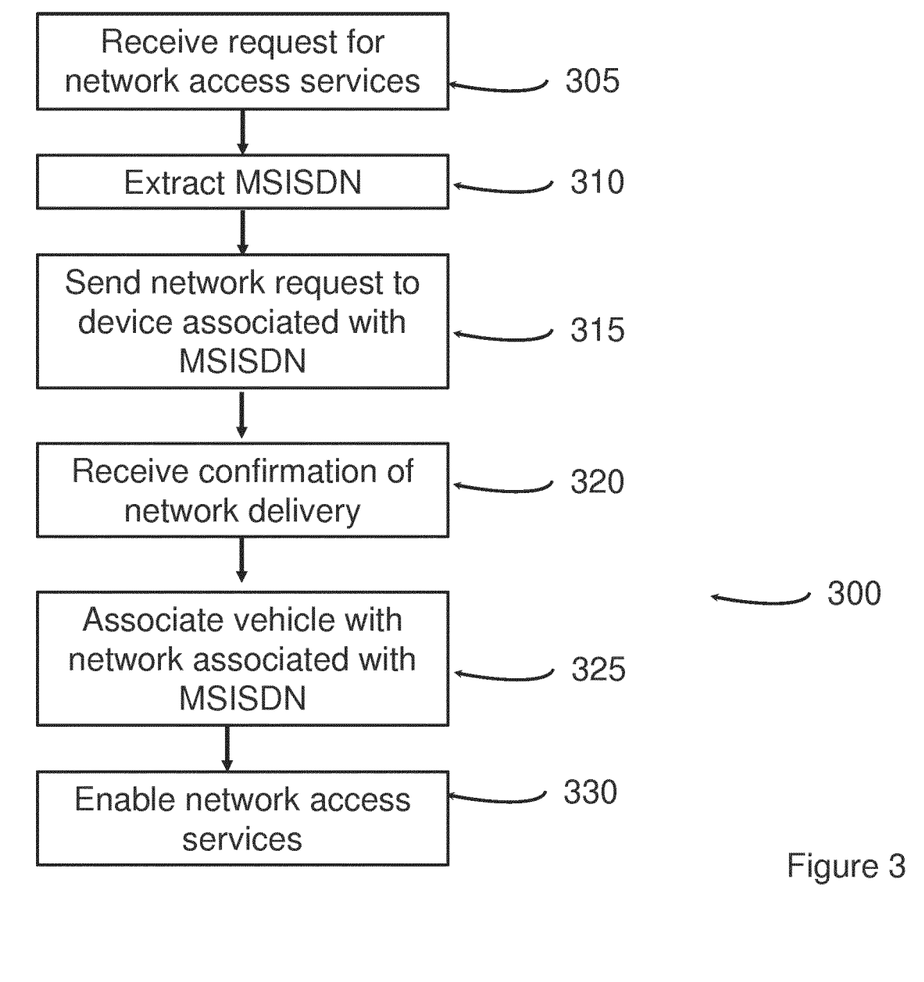
FIG. 3 is a process flow showing an exemplary process flow associated with enabling network access to an in-vehicle infotainment system.
Figure 4:
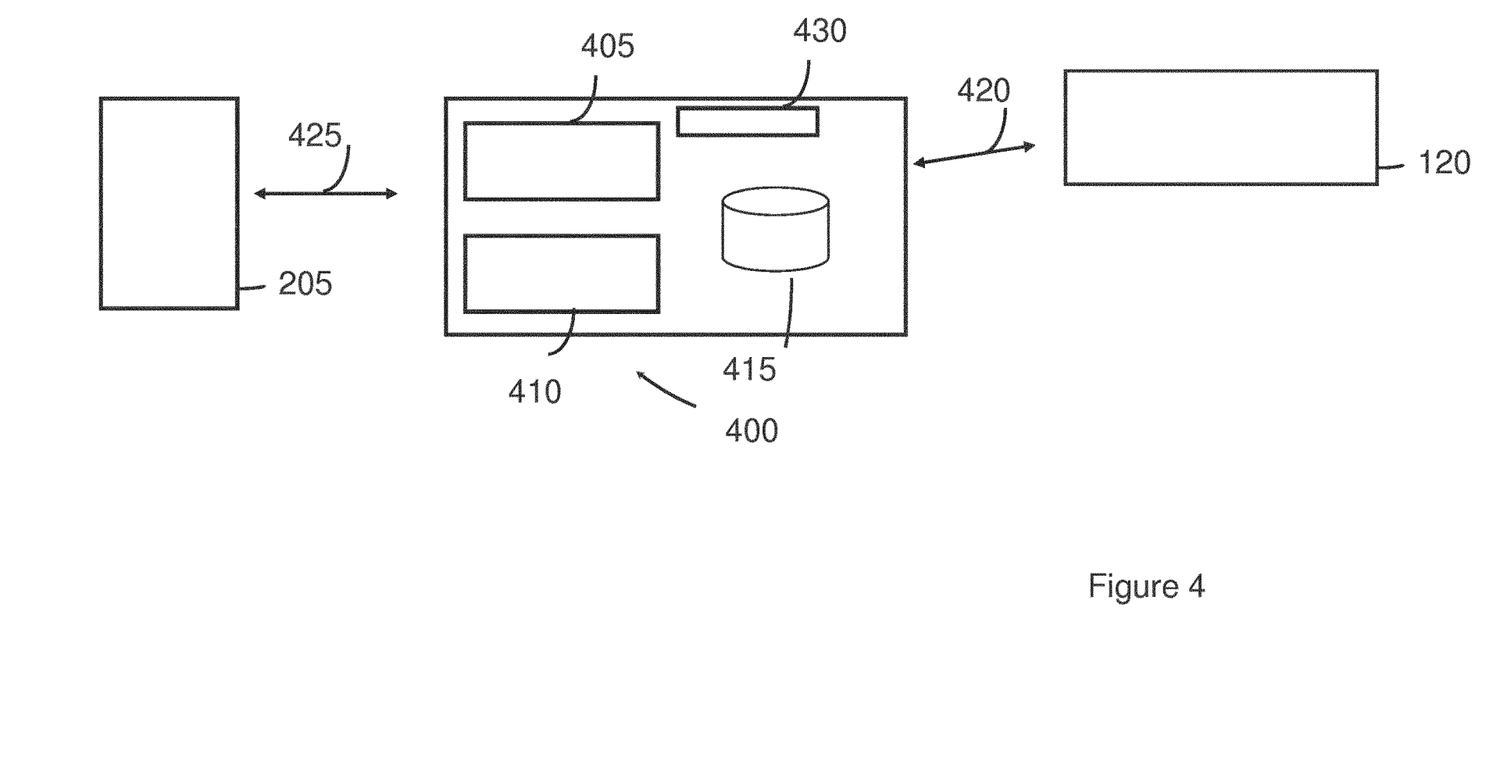
FIG. 4 shows in schematic form system components that may be usefully employed within the context of the present teaching.

FIG. 3 provides an exemplary methodology that provides such an association between a dedicated vehicle SIM and a mobile device SIM, as provided in the user's mobile device. The process flow is from the perspective of the ACSP (120) that is in communication with in vehicle infotainment system. It will be appreciated from the schematic of FIG. 4, that such an infotainment system (400) typically comprises hardware (405) and software modules (410) that when suitably programmed facilitate both internet access via a wide area network channel (420) and can establish a local area network for example a WiFi hotspot for local area communications (425). The network access is typically associated with a SIM card (430) that is co-located in the vehicle with the infotainment system The infotainment system (400) will typically include a graphical user interface and an input module to allow a user of the vehicle access services either locally stored—for example on a local database (415)—on a network service such as the internet or on their connected mobile device (205). Similarly, the infotainment system will typically facilitate user control of the infotainment system 400 through their connected mobile device 205.

Figure 5:
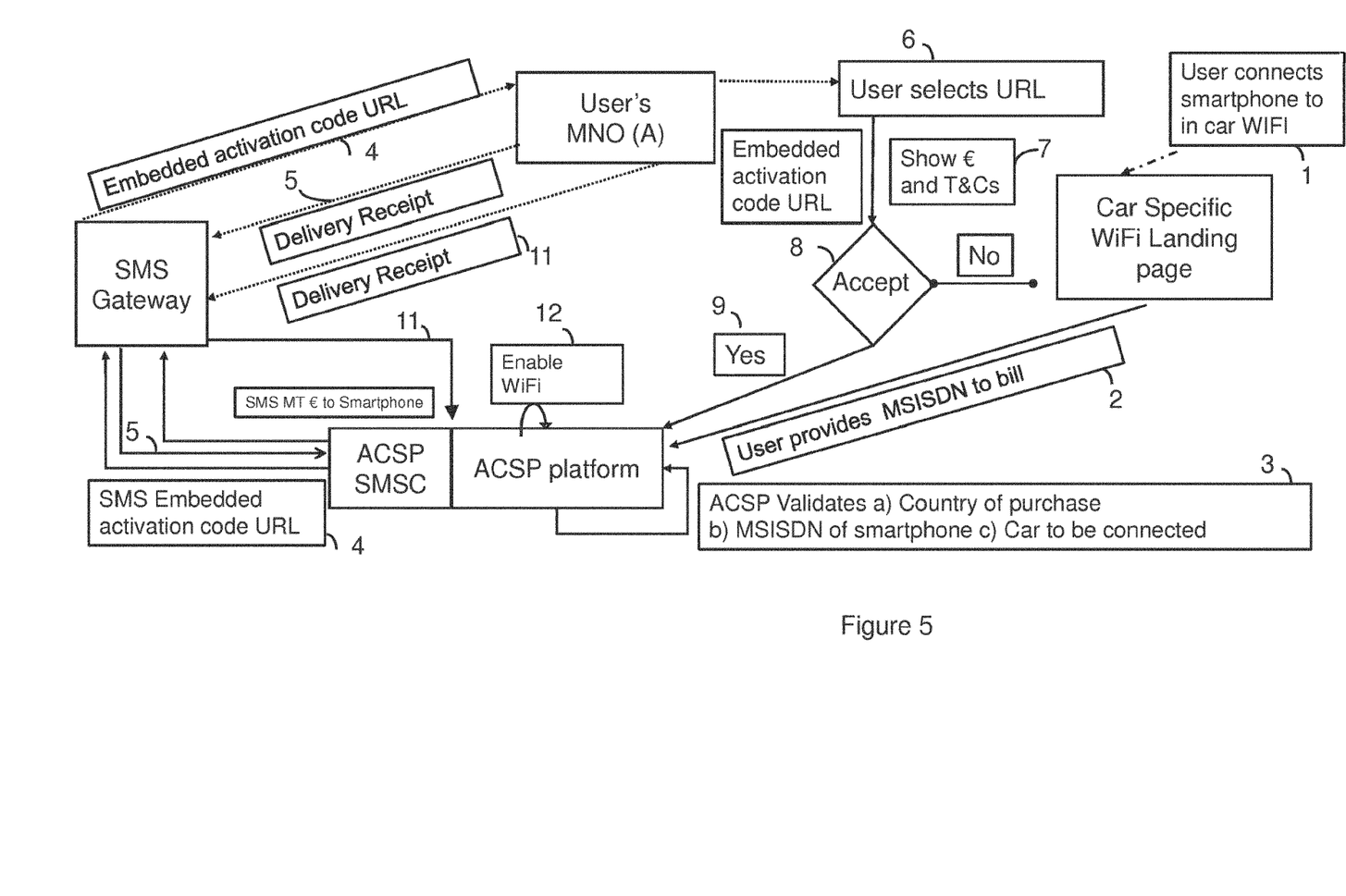
FIG. 5 is a process flow showing an exemplary process flow associated with enabling network access to an in-vehicle infotainment system.
Figure 6:
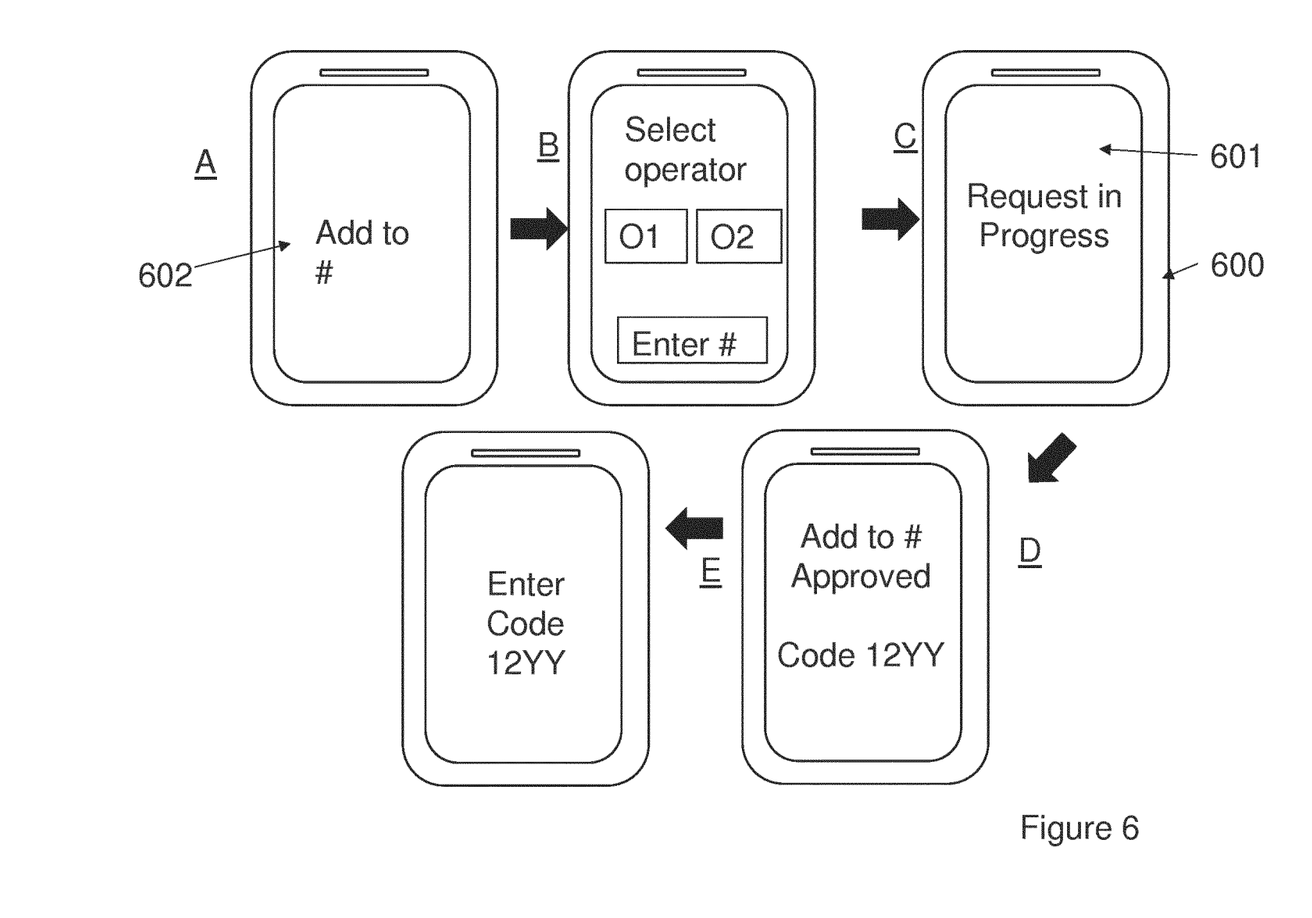
FIG. 6 shows exemplary screen shots of a process flow as viewed on a mobile device a part of a method in accordance with the present teaching.

In accordance with the present teaching and as exemplified with reference to FIGS. 3, 5 and 6, a user wishing to associate the SIM of their mobile device (205) with the SIM of the infotainment system (400) initiates (1) a WiFi connection request to the infotainment system (400). In response to this request, the user is presented on the screen (601) of their mobile device (600) a sign-up screen (602)—shown in 6A. After using the prompted interface, the user may then be presented with a geographic specific page that is based on the geographic location of the vehicle. The user is prompted to selected one of a number of available mobile operators for that geography-identified in FIG. 6B as "01" and "02". They are also provided with an interface to enter the mobile number of their handset device "Enter #".

The entering of data via that interface generates a data request (2) to the ACSP that includes an identifier of the mobile device. Desirably this identifier is the device Mobile Station International Subscriber Directory Number (MSISDN) which will be understood by those of ordinary skill to be the number used to identify a mobile phone number internationally. MSISDN is defined by the E.164 numbering plan. This number includes a country code and a National Destination Code which identifies the subscriber's operator. It will be appreciated that the mechanism via which the identifier is entered may vary. For example, the sign-in screen may present the user with an option to allow manual input of their MSISDN. In another arrangement, the launching of the sign-in screen may effect a parsing of the device identifier to automatically pull this identifier into the network access device.

It will be appreciated that as an ASCP is typically pre-associated by the vehicle manufacturer for a specific jurisdiction that the specifics of the sign-in screen can be tailored to be specific to the country that the vehicle is in.

From the perspective of the ACSP, it receives a request for network access services (305). From that request, it can extract the mobile device identifier, MSISDN, (310). The ACSP can then initiate a validation process (3) whereby it uses header information in user provided MSISDN form to identify for example:

a) Visited MNO Network and Country of Purchase—serving-network-plmnid MNC MCC.

b) MSISDN of mobile device provided by user c) MSISDN of Car Infotainment System This validation process provides information to the ACSP of both the SIM associated with the mobile device but also the MNO that is associated with that SIM. The receipt of this network access request, triggers the ACSP to send a network request to the device associated with the MSISDN. This request is send via the MNO (140) that is associated with that MSISDN. Desirably that request is in the form of a short message such as a network initiated SMS message. Other data formats such as MMS and the like could equally be used. In this exemplary arrangement of FIG. 5, the network initiated SMS message (4) includes an activation code URL that is sent to the mobile device associated with the received MSISDN.

Subsequent to the transmission of the network initiated confirmation request, the ACSP receives a confirmation of network delivery (320). This delivery receipt (5) receipt received from the MNO (14) of the mobile device proves end to end connectivity and confirms to the ACSP that there is an end to end service chain in place. Having now associated the mobile device of the originating request with the specific vehicle, the ACSP can now associate the vehicle with the MNO of the originating mobile device (325). Having so established this association, the ACSP can now enable network access services to the infotainment system of the specific vehicle (330). During this time the user is presented with a holding screen, the specifics of which may vary (FIG. 6C).

In an extension of this simple use of MNO network confirmation of the authenticity of the mobile device that originated the network access request, the present teaching also facilitates a user validation of the request in scenarios where such validation is required before initiating local WiFi services. In such an arrangement the URL that was embedded in the original network initiated SMS message is relayed to the user (6). The user selects the URL delivered in the message (4) on their mobile device. This facilitates a confirmation by the owner of the device that the original MSISDN provided in the initial network access request was correct. Such a scenario is exemplified with reference to FIGS. 6D and 6E, where the ASCP relays an authorisation code to the user handset (FIG. 6D) that was associated with the originating request.—(FIG. 6B). The re-transmission of that code back to the ASCP can be used to enhance security in that it ensures that the originating device is also used to confirm the final association of its MSISDN with the MSISDN of the in-vehicle infotainment system.

In a further modification the data exchange that is conducted as part of the association process can be parsed to extract as the first unique identifier a SIM number of the mobile device and to extract as the second unique identifier an IMEI number of the in-vehicle infotainment system. Only when each of the IMEI number and the SIM number meet a predefined lookup requirement may the association be confirmed. For example, the ASCP may be provided with a lookup table of pre-approved IMEI numbers that can be associated as part of this association process. For example this pre-approved table may specify that specific IMEI numbers are associated with a specific geographical region. Only SIM numbers that are also associated with the same geographical region may be enabled to be associated with that set of IMEI numbers. As part of the association process, the present teaching effects confirmation that the threshold criteria for association is met.

As part of a validation by the customer, the URL may direct the customer to a page where they are presented with terms and conditions (T&C's, 7) that are specific to the locality in which they are located. This can be done on the basis of a look-up table whereby the MCC value received in the first request (3) is identified and used as a basis to determine which country the service is being requested for. The user is presented with an accept (8) or deny option. The confirmation of the accept option can be used to trigger a SMS Mobile Terminated, MT, message to the mobile device MNO from the ACSP (9). It will be appreciated that MT messaging is known in the telecommunications industry as a mechanism for billing a user for additional services. It can for example be used for enabling subscription services and is advantageous in that if funds are not available at the time of transmission of a first MT message, the network service provider can retry sending second and subsequent MT messages at times in the future until funds are available. This facilitates network control of continuity of services as the network operator can control the timing of the MT messaging.

Such a SMS MT message can be used for a variety of functionality. For example, the MT message can trigger a charge for service request from the ACSP to the MNO associated with the MSISDN of the mobile device. A delivery receipt received (11) from mobile device MNO can be used to implement a reverse SMS billing whereby the user of the recipient mobile device associated with the mobile device MSISDN is charged for the cost of any network access that is associated with the MSISDN of the vehicle. In such an implementation the activation of the MT billing can be used as a trigger for the ACSP to enable (12) local WiFi Services for the vehicle and to associate data traffic originating from that vehicle with an account that is associated with the MSISDN of the mobile device that initiated the data request. Having so associated, a refresh data connection can be sent to the now WiFi connected mobile device.

It will be appreciated that the process outlined above advantageously associates traffic that originates with a first MSISDN (the vehicle MSISDN) with another otherwise unrelated MSISDN, the mobile device MSISDN. This association enables network services to the user of the vehicle without any configuration changes required at the vehicle, the enablement of the services are based on network configuration changes only. The functionality of the infotainmet system can be delivered through embedded solutions where the connectivity and the processing intelligence is built directly into the vehicle and are provided by a network service provider selected by the vehicle manufacturer as having the bandwidth and coverage characteristics that are sufficient to support the services required by the connected vehicle, without the user of the vehicle having to directly engage with that network service provider to activate those services. The user of the vehicle continues to use their existing service provider for their mobile device network usage and can use a different service provider for their vehicle network usage without an active need to enrol or engage directly with that service provider.

It will be appreciated that as the association is browser based it can be provided on a device and operating system agnostic basis—there is no requirement for installation of applications or other dedicated program interfaces to facilitate a triggering of the vehicle originating network access.

It will be appreciated that not only is the functional interface between the mobile device user and the ACSP platform opaque to that user, there is also no direct commercial relationship required between the user and ACSP.

It will be further appreciated that conventionally when faced with the problem of how to enable in-vehicle network access, the person of skill has adopted the approach trying to avoid use of the ACSP entirely, by moving services from ACSP to the MNO to which the user has an existing relationship. Per the present teaching the preferred network operator as determined by the vehicle manufacturer can retain responsibility for enabling network services for that vehicle but the user of the vehicle does not have to engage with that network service provider. An arrangement per the present teaching thereby enables an optimisation of network connectivity for vehicle originating network traffic by using a MNO that is configured specifically for that vehicle's network requirements. At the same time, the user benefits in that they can, for example, use their MNO relationship to pay for this network access as required. Service is enabled by applying changes at a network only, Local ID verification requirements are met as the mobile device owner has provided their local MSISDN which is already pre-registered with an existing MNO and hence already meets Local ID verification requirements.

A process per the present teaching can be configured to be automatically activated where there is no active customer service subscription or payment method associated with the infotainment system. In other configurations the infotainment system may be configured to provide a portal through which user settings may be varied to allow changes to existing configuration settings. For example, the user can determine the duration of association of the traffic from the infotainment system with the MSISDN of their handset. This can be done on a traffic volume—for example X MB, a time duration—for example 1 month or a combination of both. Continuation of service can be managed through modification of user settings and may be done on a roll-over basis or requiring re-activation. Termination of services can be configured by direct messaging from the handset, for example using an SMS STOP command.

By implementing an arrangement where the network functionality provided to a vehicle does not require a direct relationship between the network service provider providing that relationship and the user of the vehicle, the present teaching allows for switching between network service providers dependent on network configurations or conditions. For example, the ACSP platform as discussed above, could provide an interface between a vehicle and a plurality of network operators. The vehicle manufacturer could use that single interface to implement changes in which network operator is serving a fleet of vehicles without requiring any changes by the users of those vehicles. Therefore, it will be appreciated that whilst the present teaching has been described with reference to exemplary arrangements that modifications can be made to that described herein without departing from the scope of the present teaching.

The provision of an association per the present teaching also improves the security in provision of data services to a vehicle. Using the vehicle infotainment system as a portal into the actual vehicle management system, the present teaching provides for a control and restriction of network data traffic originating from the vehicle and sent to the vehicle on the basis of that traffic being associated with a specific user device.

The words comprises/comprising when used in this specification are to specify the presence of stated features, integers, steps or components but does not preclude the presence or addition of one or more other features, integers, steps, components or groups thereof.

The invention claimed is:

1. A method of providing network access to an in-vehicle infotainment system (400) of a vehicle (100) through a network access node (120) pre-associated with the vehicle (100), the in-vehicle infotainment system being associated with a first unique network identifier, the method comprising:
   receiving, at the network access node (120), in response to a login request triggered at a mobile device, a data request (2) from the mobile device (205), the mobile device being associated with a second different unique network identifier, the data request being received over a first communication channel, the first communication channel using a packet switched network;
   extracting, by the network access node (120), from the data request (2) the second different unique network identifier and details of a mobile network operator (140) that is associated with the second different unique network identifier;
   initiating by the network access node (120), in response to the received data request, a mobile terminated SMS message to the mobile device over a second communication channel, the second communication channel using a circuit switched network provided by the mobile network operator (140) that is associated with the second different unique network identifier, the mobile terminated SMS message including an activation URL;
   in response to user selection of the activation URL, receiving, by the network access node (120), from the mobile device, a confirmation of network delivery of the mobile terminated SMS message; and
   in response to the received confirmation of delivery of the mobile terminated SMS message, associating by the network access node, at the network access node, the first unique network identifier with the second unique network identifier such that subsequent network traffic that is received at the network access node that originates from the in-vehicle infotainment system and is identifiable with the first unique network identifier is associated with an account that is associated with an MSISDN of the mobile device.

2. The method of claim 1 wherein the first communication channel uses http protocols.

3. The method of claim 1 wherein the data request is a browser-initiated communication session.

4. The method of claim 1 wherein the second communication channel is over a cellular radio network.

5. The method of claim 1 wherein the subsequent network traffic is enabled by the network access node without requiring authorisation of the first unique network identifier within the network.

6. The method of claim 1 wherein the associating by the network access node of the network traffic with the second unique network identifier triggers a billing event for the mobile device.

7. The method of claim 1 wherein, in response to the login request triggered at the mobile device, the method further comprises displaying on a screen of the mobile device, a landing page specific to the vehicle in which in-vehicle infotainment system is located.

8. The method of claim 7 wherein the landing page includes geographic specific parameters.

9. The method of claim 1 wherein the second unique network identifier is a SIM number.

10. The method of claim 1 wherein the in-vehicle infotainment system has an IMEI number, the IMEI number being the first unique network identifier.

11. The method of claim 1 wherein the data request is parsed by the network access node to extract the second unique network identifier, the second unique network identifier being a SIM number and the in-vehicle infotainment system having an IMEI number as the first unique network identifier, and the mobile terminated message is transmitted on confirmation by the network access node that each of the SIM number and IMEI number meet a predefined lookup requirement is associated with a same geographical location.

12. A method of providing network access to an in-vehicle infotainment system of a vehicle through a network access node pre-associated with that vehicle, the in-vehicle infotainment system being associated with a first unique network identifier, the method comprising:
   receiving, at the network access node, in response to a triggered login request, a data request from a mobile device, the mobile device being associated with a second different unique network identifier, the data request being received over a first communication channel, and the first communication channel using a packet switched network;
   extracting, by the network access node, from the data request the second different unique network identifier and details of a mobile network operator that is associated with the second different unique network identifier;

initiating, by the network access node in response to the received login request, a network initiated SMS message to the mobile device over a second communication channel, the second communication channel using a circuit switched network provided by the mobile network operator that is associated with the second different unique network identifier and the network initiated SMS message including an activation URL;

receiving, by the network access node, a confirmation of network delivery of the network initiated SMS message;

in response to the received confirmation of delivery of the mobile terminated SMS message, associating by the network access node, at the network access node, the first unique network identifier with the second unique network identifier such that subsequent network traffic that is received at the network access node that originates from the in-vehicle infotainment system and is identifiable with the first unique network identifier is associated with an account that is associated with an MSISDN of the mobile device; and receiving, in response to the delivery of the network initiated SMS message to the mobile device, confirmation of the association of the first unique network identifier with the second unique network identifier and triggering a mobile terminated SMS message to the mobile network operator from the network access node, the mobile terminated SMS message triggering a charge for service request from the network access node to the mobile network operator associated with the second unique network identifier of the mobile device.

13. A network access node configured to provide network access to an in-vehicle infotainment system of a vehicle, the vehicle being pre-associated with the network access node, the in-vehicle infotainment system being associated with a first unique network identifier, the network access node being configured to:

receive, in response to a triggered login request, a data request from a mobile device, the mobile device being associated with a second different unique network identifier, the data request being received over a first communication channel, and the first communication channel using a packet switched network;

extract, from the data request, the second different unique network identifier and details of a mobile network operator that is associated with the second different unique network identifier;

initiate, in response to the received login request, a network initiated SMS message to the mobile device over a second communication channel, the second communication channel using a circuit switched network provided by the mobile network operator that is associated with the second different unique network identifier and the network initiated SMS message including an activation URL;

receive, a confirmation of network delivery of the network initiated SMS message;

associate, in response to the received confirmation of delivery of the mobile terminated SMS message at the network access node, the first unique network identifier with the second unique network identifier such that subsequent network traffic that is received at the network access node that originates from the in-vehicle infotainment system and is identifiable with the first unique network identifier is associated with an account that is associated with an MSISDN of the mobile device; and receive, in response to the delivery of the network initiated SMS message to the mobile device, confirmation of the association of the first unique network identifier with the second unique network identifier and trigger a mobile terminated SMS message to the mobile network operator from the network access node, the mobile terminated SMS message triggering a charge for service request from the network access node to the mobile network operator associated with the second unique network identifier of the mobile device.

14. The network access node of claim 13 wherein the first communication channel uses http protocols.

15. The network access node of claim 13 wherein the second communication channel is over a cellular radio network.

16. The network access node of claim 13 configured such that the subsequent network traffic is enabled by the network access node without requiring authorisation of the first unique network identifier within the network.

17. The network access node of claim 13 configured such that the associating by the network access node of the network traffic with the second unique network identifier triggers a billing event for the mobile device.

18. The network access node of claim 13 wherein the second unique network identifier is a SIM number.

19. A system comprising the network access node of claim 13, a mobile device, and a vehicle infotainment system, the system configured such that in response to the login request triggered at the mobile device, the system is configured to effect a display on a screen of the mobile device, and a landing page specific to the vehicle in which the in-vehicle infotainment system is located.

20. The system of claim 19 wherein the landing page includes geographic specific parameters.

21. The system of claim 19 wherein the in-vehicle infotainment system has an MEI number, the MEI number being the first unique network identifier.

* * * * *